United States Patent
Hawley

[11] Patent Number: 5,854,144
[45] Date of Patent: Dec. 29, 1998

[54] CUSHIONED LINER LAMINATE

[75] Inventor: James K. Hawley, Sheffield Village, Ohio

[73] Assignee: Manco, Inc., Avon, Ohio

[21] Appl. No.: 964,194

[22] Filed: Nov. 10, 1997

[51] Int. Cl.⁶ .................. B32B 5/18; B32B 5/24
[52] U.S. Cl. ............ 442/56; 442/370; 442/101; 442/401; 428/904.4; 428/304.4
[58] Field of Search ............ 442/56, 370, 101, 442/401; 428/904.4, 304.4, 315.5

[56] References Cited

U.S. PATENT DOCUMENTS

| | | |
|---|---|---|
| 1,499,166 | 6/1924 | Frazier . |
| 3,506,533 | 4/1970 | Berner . |
| 4,039,709 | 8/1977 | Newman ..................... 442/370 X |
| 4,088,805 | 5/1978 | Wiegand ..................... 442/370 |
| 4,116,743 | 9/1978 | Davis . |
| 4,296,162 | 10/1981 | Jean . |
| 4,305,985 | 12/1981 | Heublein . |
| 4,316,926 | 2/1982 | Kaminstein . |
| 4,524,097 | 6/1985 | Graham . |
| 4,531,994 | 7/1985 | Holtrop et al. ..................... 442/370 X |
| 4,603,074 | 7/1986 | Pate . |
| 5,120,587 | 6/1992 | McDermott . |
| 5,292,576 | 3/1994 | Sanders ..................... 428/904.4 X |
| 5,316,840 | 5/1994 | Kubo . |
| 5,346,278 | 9/1994 | Dehondt . |
| 5,364,681 | 11/1994 | Pate . |
| 5,707,903 | 1/1998 | Schottenfeld ..................... 442/56 X |

OTHER PUBLICATIONS

PCT Application No. PCT/US96/17206 published Apr. 17, 1997, the International Search Report associated therewith, and copies of the references cited.

PCT Application No. PCT/US96/20448 published Jul. 10, 1997, the International Search Report associated therewith, and copies of the references cited.

*Primary Examiner*—Daniel Zirker
*Attorney, Agent, or Firm*—Vickers, Daniels & Young

[57] ABSTRACT

A sheet material is provided having a smooth top and a continuous non-slip foam bottom. The material is created by laminating a printed plastic sheet to a foam material carried on a non-spun polyester fabric.

9 Claims, 1 Drawing Sheet

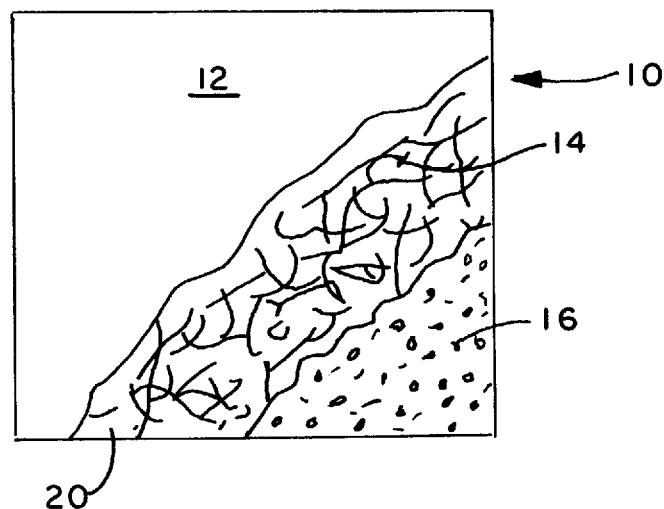
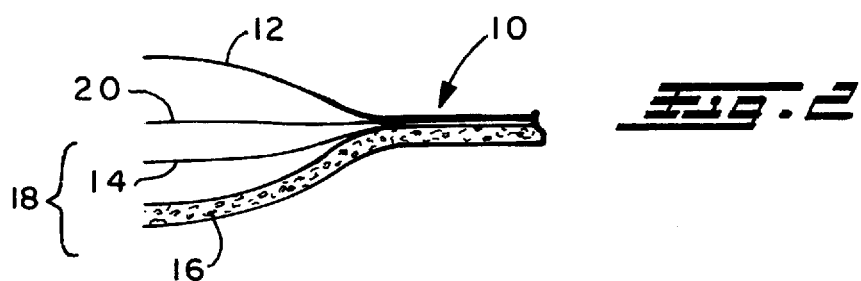
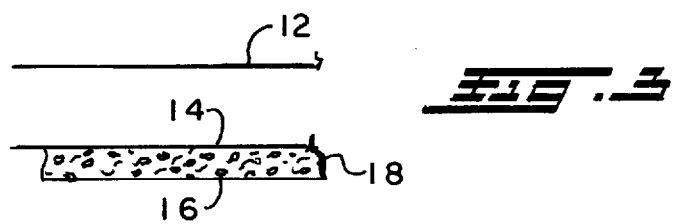
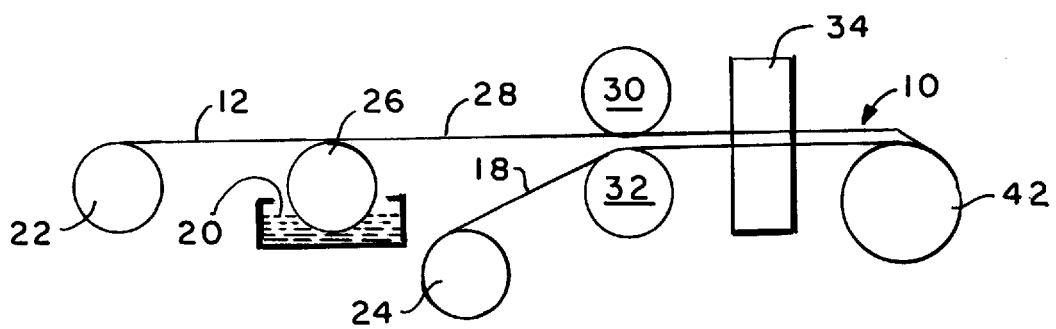

CUSHIONED LINER LAMINATE

FIELD OF THE INVENTION

This invention relates to sheet material usable by a consumer to protect surfaces and more particularly to multilayer sheet material having uniform characteristics with a continuous decorative top surface and a continuous foam bottom surface.

BACKGROUND OF THE INVENTION

Consumers use a wide variety of sheet materials in and around the home as an underlayment and lining material. Decorative papers have been used for many years to line drawers and shelves. Some decorative papers are provided with an adhesive on one side to provide a more permanent lining. Plastic materials, such as polyvinyl chloride, have also been provided in sheet form for use by consumers as liners. Some of these plastic materials are provided as a simple sheet. Other plastic materials are provided with an adhesive on one side for a more permanent installation. For more than a year, consumers have also been provided with foam plastic materials for use as liners. These materials provide cushioning and are also less prone to slipping. One such material consists of a loosely woven fabric scrim with a foam polyvinyl chloride coating. This material is noncontinuous in that the openings between many of the adjacent scrim fibers remain open after the application of the foam. The foam has a nonslip characteristic but is not an adhesive. This material provides good cushioning and nonslip characteristics. It has been well received in the consumer marketplace and used widely as a lining material and underlayment. Such foam covered scrim sheet material is commercially available in various sizes. Companies such as Griptex Industries, Inc. of Alpharetta, Ga. and American Nonslip produce such materials commercially. Recently, non-continuous foam covered scrim sheets with a continuous paper or plastic top sheet have also been available.

All of the above described materials have negative aspects. Paper or plastic nonadhesive shelf lining can slide around on the surface to which it is applied. In drawers in particular, such linings can become bunched up and pushed to the rear of the area sought to be protected. Such shelf linings do not provide cushioning or protection for things placed on a shelf or in a drawer. Adhesive paper or plastic shelf liners do not normally become bunched up or slide when first installed. However, thereafter, portion of the adhesive may dry out allowing the lining to slide and become bunched up. In other situations, the adhesive sticks to the surface under the lining paper even when the lining paper is removed. Vinyl foam is often used and can mar a surface and leave an objectionable, sticky, discolored area on a shelf or in a drawer.

On the other hand, foam plastic covered scrim shelf linings have their own problems. While they do not slide on a shelf or in a drawer and can be removed, they prevent objects placed on them from sliding. A homeowner cannot put a cup on a shelf and slide it along that shelf to a desired position. Rather, it must be picked up and moved. The scrim based shelf linings are also noncontinuous. They have numerous openings forming part of the product. The appearance is therefore often not as pleasing to consumers as what can be achieved on a continuous paper or plastic surface. Even when provided with a continuous paper or plastic top layer, problems remain. The non-continuous scrim under the paper or plastic gives the liner a bumpy displeasing appearance. Because the scrim is an open weave, a user sometimes obtains a ragged edge when cutting the liner to fit a drawer. The bottom of the liner is difficult to keep clean because of the large number of openings in the scrim. A large quantity of adhesive must be used to bind the top layer to the foamed scrim because of its irregular shape and foamed surface. The foamed scrim sometimes mars the finish of the thing it is supposed to protect.

SUMMARY OF THE INVENTION

It is the principle object of the invention to provide a sheet material overcoming the above referred to negative aspects which is nonslip, nonadhesive and provides a smooth continuous top surface.

It is another object of the present invention to provide a sheet material having an upper surface which is pleasing in appearance, colorful and smooth.

It is still another object of the present invention to provide a sheet material product which has no voids extending through the foam, is easily cut with scissors providing a non-ragged edge, will maintain its shape and position, is not adhesive, will not mar surfaces, and has a continuous smooth top surface.

It is yet another object of the present invention to provide an improved sheet material which is inexpensive to manufacture while providing superior properties.

In accordance with the present invention, there is provided a laminate product comprised of a thin non-woven fiber sheet having a continuous foam layer on one side and a thin continuous smooth surface top sheet layer on the other side.

Further in accordance with the invention, the foam layer provides pressure sensitive nonslip characteristics. When lightly placed on a surface, it can be moved. But, when pressed down, it will hold its position until lifted.

Still further in accordance with the invention, the smooth surfaced thin continuous top sheet is bound to the non-woven fiber sheet by means of a thin layer of adhesive.

Still further in accordance with the invention, a laminate is provided having a decorative continuous plastic top sheet adhesively bound to a continuous non-woven fiber sheet and a continuous foam layer fixed to the bottom of the fiber sheet.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 is a plan view of the sheet material of the present invention looking at the top side with layers partially cut away;

FIG. 2 is a cross section of the present invention with the layer partially peeled apart;

FIG. 3 shows two portions of the sheet material of FIG. 1 prior to final manufacturing; and, FIG. 4 is a schematic diagram of a method and apparatus for making the sheet material seen in FIGS. 1 and 2.

DESCRIPTION OF THE PREFERRED EMBODIMENT

Referring now to the drawings wherein the showings are made for the purposes of illustrating a preferred embodiment of the invention only and not for purposes of limiting same, FIGS. 1 and 2 show a laminate sheet material 10. The sheet material 10 comprises a smooth continuous top layer 12, a non-woven spun bond polyester fabric intermediate layer 14 and a bottom foam layer 16.

The top layer 12 is preferably a decorative continuous sheet. While it can be paper, in the preferred embodiment the top layer is a polyvinyl chloride plastic sheet having decorative patterns printed thereon. The top layer 12 can be a solid color or a complex print. Printed PVC film is available from a wide variety of sources commercially.

The bottom foam layer 16 is preferably a non-skid aqueous dispersion closed cell foam. The bottom foam layer is approximately 0.034 or 0.040 inches thick with a tolerance of ±0.005 inches. The foam layer could be as thin as 0.02 inches or as thick as 0.10 inches. The density of the foam is such that the weight of the 0.040 inch thick layer is approximately 3.5 ounces per square yard. Of course, a thicker heavier foam can be used. The foam material is a polyurethane foam without plasticizers or oils which has good characteristics of resiliency and will not adversely affect the finish of an underlying surface. PVC foams on scrim supports used in the past have contained plasticizers which leach out over time. Plasticizers sometimes discolor the surface upon which the foam is placed.

Alternatively, a water based polymer also fabricated without the use of plasticizers or oils can be used in place of the polyurethane. In either event, a long lived product which will not damage underlying surfaces is provided.

The fabric intermediate layer 14 comprises randomly oriented polyester fibers and is thin and relatively smooth. It is substantially continuous having no sizeable pores. The bottom foam layer 16 is created by coating foam material onto the fabric intermediate layer and allowing it to cure. This creates an intermediate laminate 18 (FIG. 3). Products using the technology of coating foam onto a fabric layer have been available for a number of years. Foam Products Corporation of 350 Beamer Road, SW, Calhoun, Ga. 30701-7949 has been providing such materials for a number of years. One such product is the well known consumer product Dr. Scholls insoles consisting of a fabric layer with a foam layer coated onto the fabric.

Other companies also provide various foams coated onto various fabrics as desired. Such product are commercially available.

A thin layer of adhesive 20 is used to bind the top layer 12 to the fabric intermediate layer 14. Because the fabric intermediate layer 14 and the top layer 12 are both substantially flat and continuous, a very thin layer of adhesive can be used. Substantially less adhesive 20 is used in the present invention when compared to the amount of adhesive required to bind a vinyl top layer to a discontinuous foam on scrim type non-skid as used in the prior art. Substantial cost savings result.

FIG. 4 illustrates the manufacturing process for the laminate sheet material 10. A polyvinyl chloride sheet top layer 12 is provided on a first feed roll 22. The intermediate laminate 18 is provided on a second feed roll 24. Adhesive 20 is coated onto one side of the top layer 12 by means of a transfer roll 26 or other conventional means. The thickness of the adhesive can be controlled by the viscosity of the adhesive 20 applied to the roll 26 or other known means. The adhesive coated layer 28 and the intermediate laminate 18 are joined at pinch rollers 30, 32 where the layers are pressed together. The combined layers are pulled through a drying oven 34 where the adhesive is cured and the finished laminate sheet material 10 is taken up on a take-up roll 42.

It may be desirable to coat the adhesive 20 on the fabric intermediate layer 14 rather than the top layer 12. In such a case, the intermediate laminate is placed on the first feed roll with the fabric intermediate layer facing down. The top layer 12 is placed on the second feed roll 24 with the decorative face facing down. Thus, the adhesive can be coated onto either surface as desired in the manufacturing process.

The resulting laminate sheet material 10 has a uniform density, uniform thickness and uniform characteristics over its entire width and over manufactured lengths. Considerably more control is achieved over the finished product. No thick spots or large voids in the foam are present as are present in prior art scrim materials. More uniform pressure sensitive non-slip characteristics can be achieved. Polyurethane based foam material rather than polyvinyl chloride based is more well behaved with respect to underlying finished surfaces. Moreover, the continuous polyurethane based foam provides a cohesive attractive force holding the material in place. The material acts as if it is lightly adhesively bound to the surface but, in fact, no adhesive is used. The positive aspects of an adhesive binding, holding in place, is present. The negative aspects of an adhesive, such as residue, are not.

The invention has been described with reference to a preferred embodiment. Obviously, modifications and alterations will occur to others upon the reading and understanding of this specification and it is intended to include such modifications and alterations as they come within the scope of the intended claims or the equivalents thereof.

Having thus described the invention, it is claimed:

1. A nonslip, nonadhesive multilayer sheet material for covering household surfaces comprising:
   a thin continuous non-woven fiber sheet having a top face and a bottom face;
   a continuous uniform foam plastic layer permanently fixed to said non-woven fiber sheet bottom face; and,
   a thin continuous sheet top layer adhesively bound to said non-woven fiber sheet top surface.

2. The sheet material of claim 1, wherein said foam plastic layer is approximately 0.034 to 0.04 inches thick.

3. The sheet material of claim 2, wherein said foam plastic layer is a non-skid aqueous dispersion based foam plastic layer.

4. The sheet material of claim 3, wherein said foam plastic layer is a polyurethane foam.

5. The sheet material of claim 4, wherein said non-woven fiber sheet is a spunbonded polyester non-woven fiber sheet.

6. The sheet material of claim 5, wherein said spunbonded polyester non-woven sheet material weighs about one ounce per square yard.

7. The sheet material of claim 6, wherein said thin continuous sheet top layer is polyvinyl chloride sheet approximately 0.004 inches to 0.008 inches thick.

8. The sheet material of claim 7, wherein said total thickness of said sheet material is approximately 0.044 inches and the thickness and characteristics of said sheet material are continuous across its width and over its length.

9. The sheet material of claim 8, wherein said foam material has no apertures through its entire depth.

* * * * *